United States Patent [19]

Finnin

[11] 3,812,471

[45] May 21, 1974

[54] I/O DEVICE RESERVE SYSTEM FOR A DATA PROCESSOR

[75] Inventor: George R. Finnin, Collegeville, Pa.

[73] Assignee: Sperry Rand Corporation, New York, N.Y.

[22] Filed: Aug. 30, 1972

[21] Appl. No.: 284,991

[52] U.S. Cl. .......................................... 340/172.5

[51] Int. Cl. ......................... G06f 3/04, G06f 13/06

[58] Field of Search ............ 444/1; 340/172.5, 147, 340/149, 150

[56] References Cited

UNITED STATES PATENTS

| | | | |
|---|---|---|---|
| 3,253,262 | 5/1966 | Wilenitz et al. | 340/172.5 |
| 3,303,476 | 7/1967 | Moyer et al. | 340/172.5 |
| 3,404,376 | 10/1968 | Brown et al. | 340/172.5 |
| 3,508,194 | 4/1970 | Brown | 340/146.1 |
| 3,386,082 | 5/1968 | Stafford et al. | 340/172.5 |
| 3,623,013 | 11/1971 | Perkins et al. | 340/172.5 |
| 3,576,544 | 4/1971 | Cordero et al. | 340/172.5 |
| 3,680,053 | 7/1972 | Cotton et al. | 340/172.5 |
| 3,713,109 | 1/1973 | Hornung | 340/172.5 |

*Primary Examiner*—Paul J. Henon
*Assistant Examiner*—Jan E. Rhoads
*Attorney, Agent, or Firm*—Charles C. English

[57] ABSTRACT

An I/O device reserve function is provided for a data processing system in which any of a plurality of input-output (I/O) devices can be selectively reserved to any of a plurality of programs being executed by the system. A reserve register is located in each of the I/O devices to be reserved. On command from a program the reserve register of a selected device is loaded with a bit pattern which identifies the reserving program. The bit pattern stored in the reserve register of the device is compared with the bit pattern of any subsequent program attempting to reserve the same device. If the bit patterns are not identical the subsequent program receives a device "busy" signal indicating that the called device is reserved. A release circuit is provided for releasing the reserved device upon issuance of a release command thereto.

4 Claims, 7 Drawing Figures

I/O DEVICE RESERVE SYSTEM FOR A DATA PROCESSOR

BACKGROUND OF INVENTION

This invention relates to a novel input-output device reserve system for a data processing system.

In a multi-processor or multi-program data processing system it frequently occurs that it is desired to reserve one or more of the input-output (I/O) devices of the system to one or more of the programs or processors. For example, in a multi-program system using a plurality of disc memory input-output files, it may be desired to reserve one or more of the disc files to one or more of the programs of the system. It may also be desired to be able to do this so that one or more of the disc files can be selectively reserved to a first program and then subsequently reserved for a later program.

If the reserve system can be made so that any I/O device can be reserved by any program of a multi-program processor or by any processor of a multi-processor system, a very flexible system results.

An advantage of this invention is that one or more I/O devices can be reserved by one program of a multi-programmed processor such that the reserved device or devices can still be accessed through more than one control unit by only that one program. In like fashion one or more I/O devices can be reserved by one processor in a multi-processor system such that the reserved device or devices can still be accessed through more than one control unit.

It is accordingly an object of this invention to provide a device reserve function for a data processing system wherein any of a plurality of input-output devices can be selectively reserved by any of a plurality of programs.

It is another object of this invention to provide a device reserve function as aforementioned which uses a small amount of hardware.

SUMMARY OF INVENTION

In accordance with the teachings of this invention an I/O device reserve function is provided for a conventional data processing system. Typically the data processing system may comprise one or more central data processors connected through one or more control units to a plurality of I/O devices. Each of the I/O devices is equipped with a so-called reserve register. Then when it is desired to reserve a device to a program the program is provided with a device reserve command and a unique binary coded reserve signal byte which identifies the program. The reserve command causes the unique binary coded reserve signal byte to be stored in the reserve register of a selected I/O device. A device whose reserve register has been so loaded by a reserving program is then reserved to that program or to other programs having similar reserving bit patterns in their reserving binary coded signal byte. Control means are provided so that after a device has been reserved by a program the "reserve" command of any other program not having the unique bit pattern stored in the reserve register of the reserved I/O device will be rejected until the reserved device has been released by the issuance of a programmed release command.

In the drawings to which reference is now made:

Figure 2:
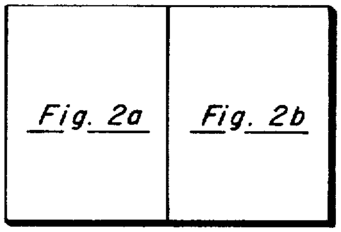
FIG. 2 is a mosaic for FIGS. 2*a* and 2*b*.
Figure 3:
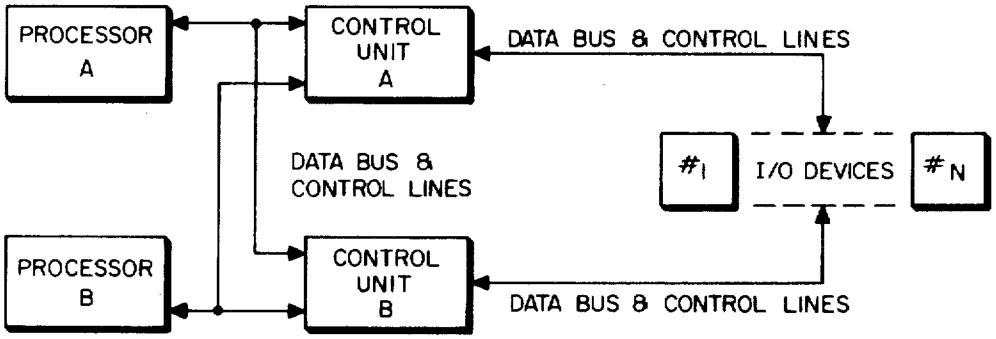
Figure 5:
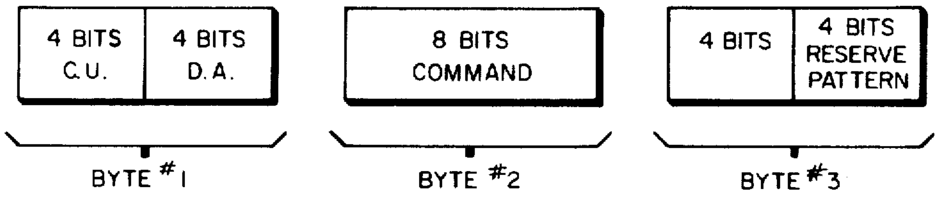
Figure 4:
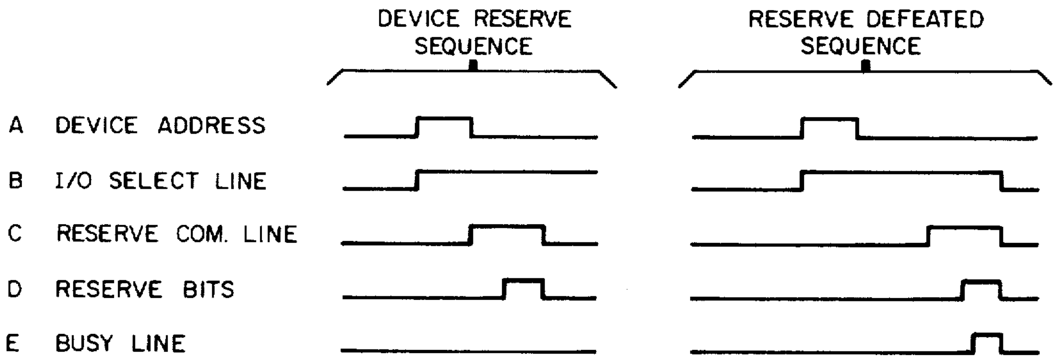
Figure 2A:
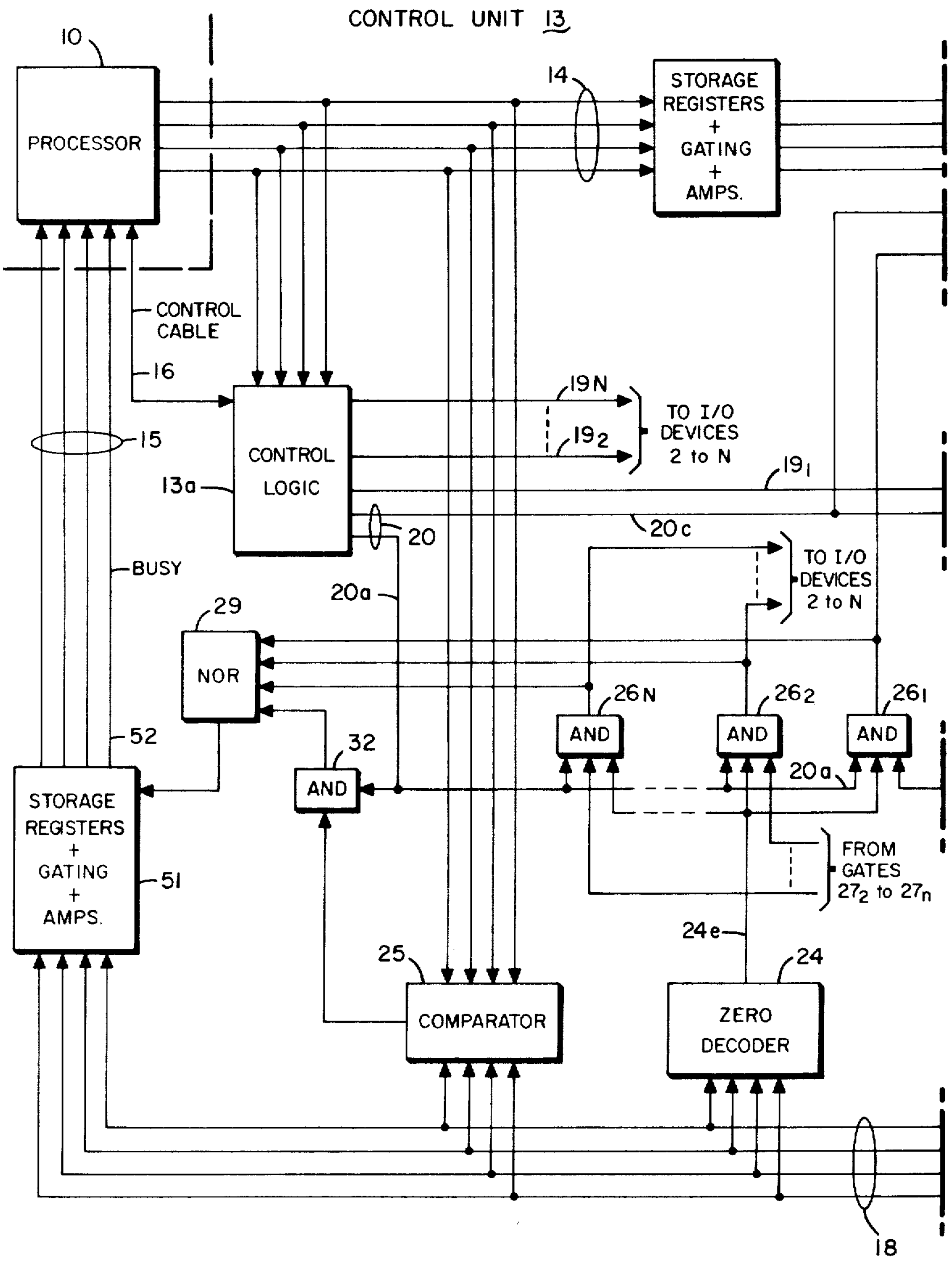
Figure 2B:
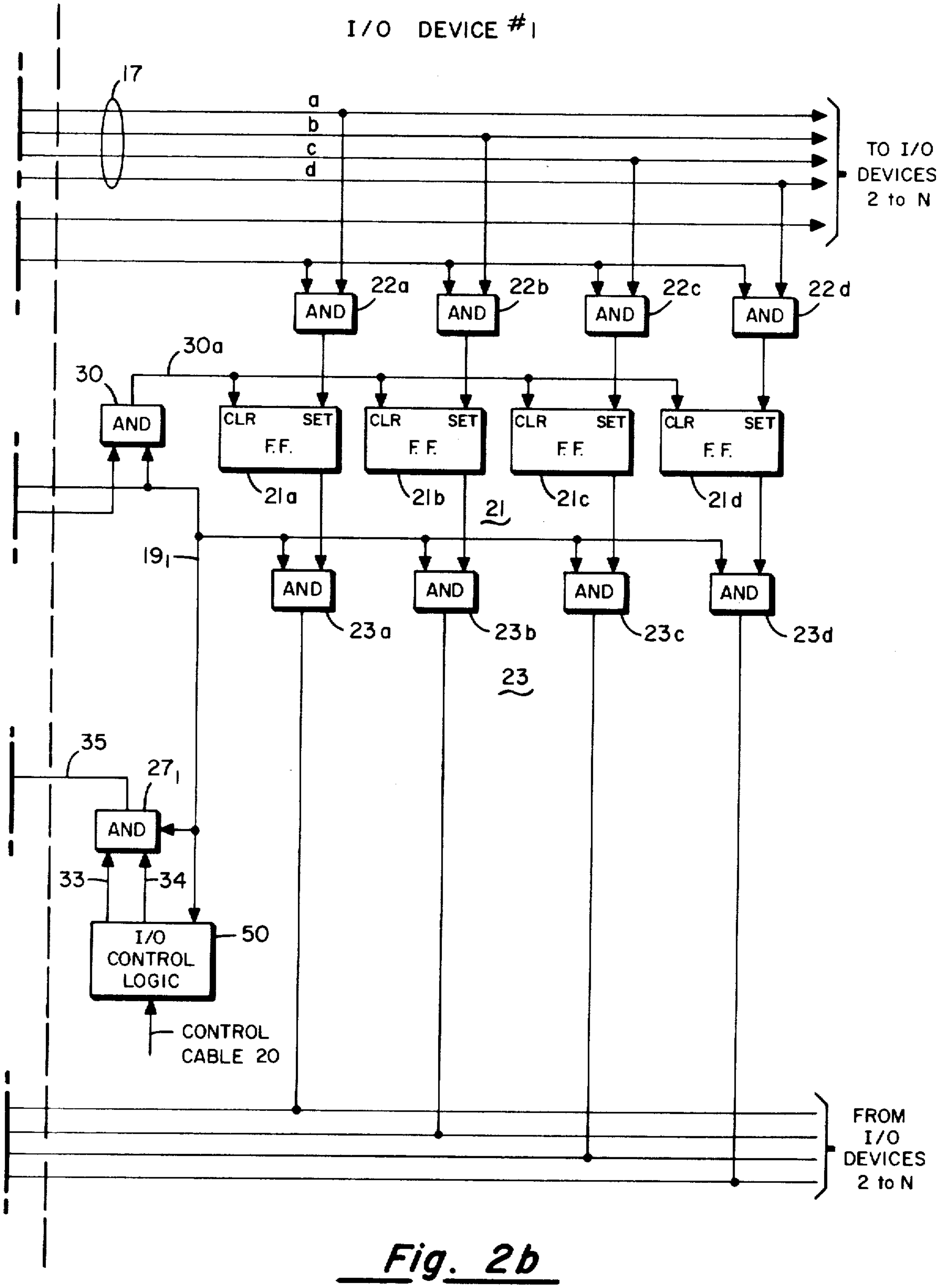

FIGS. 2*a* and 2*b* form a schematic diagram showing the present invention incorporated in a data processing system of conventional design;

FIG. 3 is a diagrammatic illustration of another typical data processing system in which the present invention can advantageously be incorporated;

FIG. 4 shows in general form the sequence of actions occurring in a program for the situation where first a reserving program is accepted and then second where a reserving program is defeated; and FIG. 5 is a diagrammatic showing of a reserve command instruction.

Figure 1:
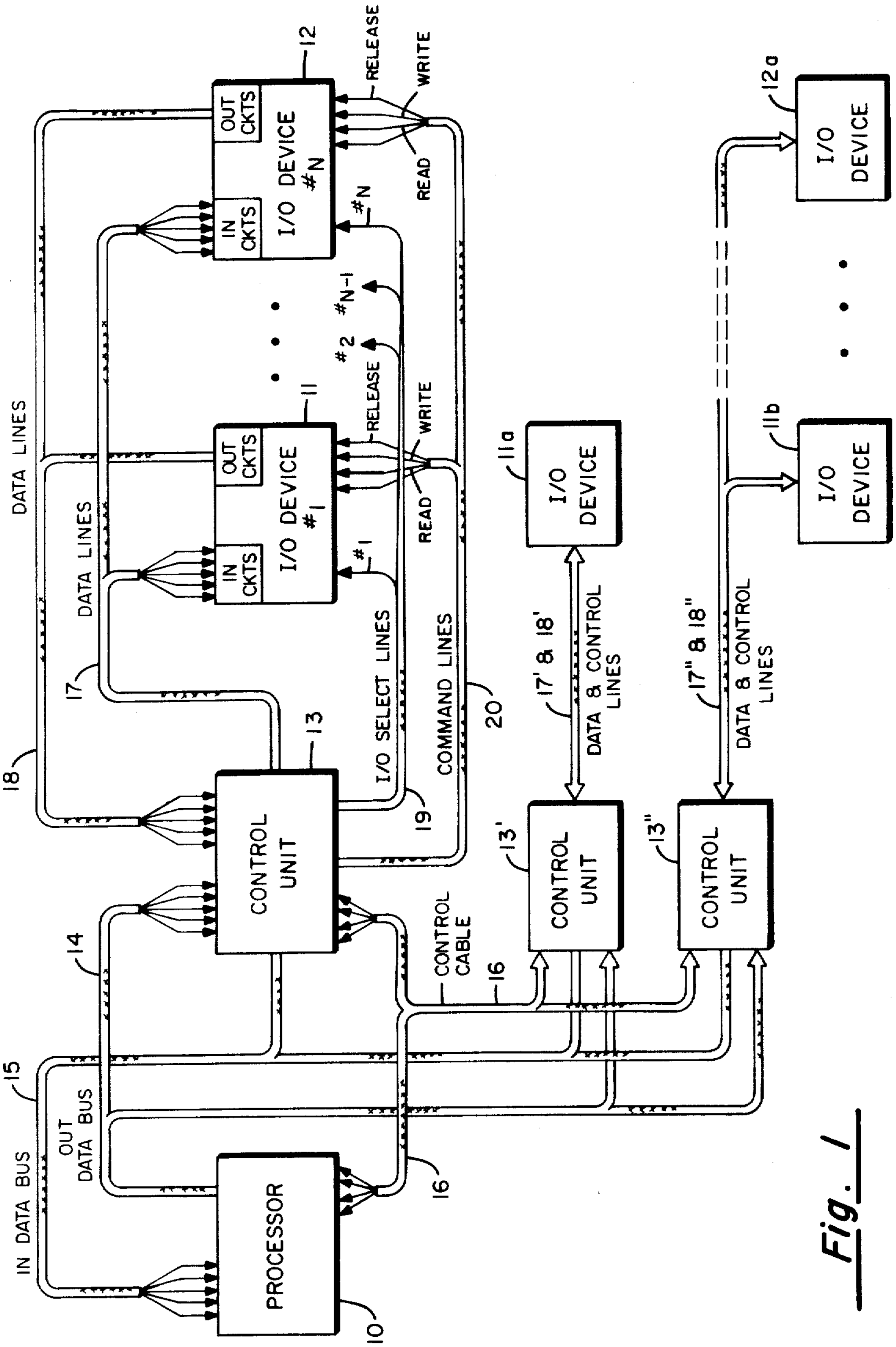
FIG. 1 is a diagrammatic illustration of one typical data processing system in which the present invention may be incorporated.

In FIG. 1 to which reference is now made, 10 represents at least one Central Data Processor Unit of conventional design. This unit may, for example, include a main memory section, an arithmetic section, a number of operating registers, a channel for control units and a control section. The component parts which define the Processor 10 are arranged so that data stored in the main memory thereof can be manipulated or processed by one or more programs stored in the main memory. Since the volume of the data normally processed by modern data processing systems and the size of the instruction strings making up the processing program far exceeds the capacity of the main memory, additional external memory is provided and includes a number of mass storage devices here represented as comprising three groups of input-output devices. The first group comprises a plurality n of such devices represented by blocks 11 and 12. The second group conprises a single such device 11*a* and the third group comprises another plurality of devices represented by blocks 11*b* and 12*a*. Typically these I/O devices may comprise conventional disc files, tape handlers, card readers, punches, high speed printers or mixture of these devices. Each group of devices is interconnected to the Central Processor 10 through a corresponding Control Unit such as 13, 13′ and 13″ via data lines 14, 15, 17, 17′, 17″, 18, 18′ and 18″. In practice, the exchange of information between the Processor 10 and the Control Units 13, 13′ and 13″ takes place one byte at a time over the data lines 14 and 15. A byte is generally considered to comprise eight parallel binary bits.

The interconnection of the Processor 10 and the Control Units is effected by a set of control signals which are developed on the set of Control Lines 16 which interconnect the Control Units and the Processor 10. Typical of these control signals are signals which indicate the nature of the eight binary bit signals being transmitted over the data lines 14 and 15. For example, when an I/O device address signal is being transmitted over the data line 14, a specific one of the Control Lines 16 is energized to signify that the device selection function is being transmitted. Similarly when a byte of data is being transmitted over data lines 14 and 15 another one of the Control Lines 16 is energized to signify this event or if an instruction is being transmitted over lines 14 another one of the Control Lines 16 is energized. Likewise, data is transmitted between the corresponding Control Units and the related group of I/O devices via data busses (such as 17 and 18 between Control Unit 13 and I/O devices 11 and 12) while control information between the Control Units and the related I/O devices is transmitted over the command or control lines such as 19 and 20. Control Lines 19 are individually and selectively energized to select the I/O device to be operated, while control lines 20 are selectively energized to set the mode and function control circuits in the selected I/O device to cause the device to perform a given function such as read, write, feed paper, or cards, rewind, etc.

The Control Units 13, 13' and 13'' like the Processor 10 are of conventional design and typically may include a buffer memory, various control registers, counters and decoders for decoding various bit patterns stored in the Control Registers.

In general the organization shown in FIG. 1, except as hereinafter described in connection in FIG. 2 is of a conventional character and may correspond, for example to the UNIVAC 9000 series systems manufactured by the Univac Division of the Sperry Rand Corporation.

Reference is now made to FIGS. 2*a* and 2*b* where the modification to FIG. 1 which comprises my invention is shown. For purposes of simplication a single processor and a single control unit are shown but it will be understood that either a multi-processor organization such as shown in FIG. 3 or the organization depicted in FIG. 1 is contemplated. As indicated in FIGS. 2*a* and 2*b*, each input/output device, such as 11, 12 etc. of FIG. 1, includes a multi bit reserve register 21. For purposes of illustration, this register is shown as comprising four stages of flip-flops- 21*a* to 21*d* although any suitable number of stages could be employed if desired. With a four stage flip-flop register, 16 different bit patterns can be stored therein and hence any one of 16 different programs can selectively reserve the associated device. Each stage of the reserve register 21 has its set input terminals coupled through a respective "AND" gate 22*a* to 22*d* to the four least significant bit positions *a, b, c* and *d*, for example, of the data bus line 17 as shown. It should be understood that the data bus lines, 14, 15, 17 and 18 shown in the figure normally comprise at least eight parallel lines, but for purposes of simplification only four parallel lines are shown. The four set outputs of each of the reserve registers 21 are in turn coupled through a corresponding set of "AND" gates 23*a* to 23*d* back to the Control Unit 13 via the data bus 18. In the Control Unit 13 the four outputs of the gates 23*a* to 23*d* are coupled in parallel to the input of a zero decoder 24 and to the corresponding inputs of a four bit comparator 25. The zero decoder device 24 may be a conventional diode decoding matrix which operates to produce an output on its output line 24*e* when all of its inputs correspond to binary "zeros." This decoder 24 acts to provide an output signal on its output line 24*e* whenever the bit pattern stored in the corresponding reserve register 21 has been cleared to an all zero state. The output from decoder 24 serves as one input to each of a plurality of three input "AND" gates $\mathbf{26}_1$; $\mathbf{26}_2 - \mathbf{26}_n$. There is one such "AND" gate for each I/O device in the group coupled to the Control Unit 13. A second input to each of the "AND" gates $\mathbf{26}_1$ to $\mathbf{26}_n$ is taken from the "Reserve Command" control line 20*a* leading from control logic 13*a* in the Control Unit 13. Line 20*a* is energized whenever an I/O device associated with Control Unit 13 is to be reserved by a program or a processor. In more particular, at the start of a program in which a device reserve is to be effected, the Processor 10 issues to the control logic 13*a* over the output bus 14 a reserve command instruction. The control logic 13*a* decodes this instruction to energize line 20*a*. The third input to each of the "AND"" gates $\mathbf{26}_1$ to $\mathbf{26}_n$ is derived from the output of a respective one of another group of "AND" gates $\mathbf{27}_1$ to $\mathbf{27}_n$. Again there is one such gate $\mathbf{27}_1$ to $\mathbf{27}_n$ for each input/output device coupled to the Control Unit 13, but only one such gate $\mathbf{27}_1$ is shown. Each of the latter gates $\mathbf{27}_1$ to $\mathbf{27}_n$ receives from the Control Logic 13*a* as one input, a corresponding device selection signal on the appropriate one of the control lines $\mathbf{19}_1$ to $\mathbf{19}_n$. Again in more particular when the processor 10 wishes to reserve a given one of the devices to a program, it sends a device address instruction to the control logic 13*a* over the data bus 14. The control logic 13*a* decodes the device address instruction and energizes one of the desired select line $\mathbf{19}_1$ to $\mathbf{19}_n$ depending on which I/O device is addressed by the instruction. The other two control inputs to each of the "AND" gates $\mathbf{27}_1$ to $\mathbf{27}_n$ is developed on lines 33 and 34 by the individual device control logic 50. Each I/O device has associated with it certain control logic which is herein exemplified by block 50. Included in this logic is a device "ready" circuit which energizes line 33 when the device is ready to operate, and a device "on line" circuit which energizes line 34 when the input or output circuits of the device are coupled to the input or output busses 17 or 18.

The output of each of the "AND" gates $\mathbf{26}_1$ to $\mathbf{26}_n$ is applied in parallel to the input gates 22*a* to 22*d* of its associated reserve register as a conditioning signal to these gates and also through a "NOR" gate 29 to output circuitry 51 of the Control Unit 13. The latter circuitry 51 responds to the output signal level from gate 29 to produce a signal level on the "busy" line 52 of the data bus 15 which indicates to the Processor 10 whether or not the device reserve command has been accepted.

Also associated with each of the reserve registers 21 is a corresponding clear gate 30 the output of which is applied to the clear line 30*a* of its respective reserve register. Each of the clear gates 30 receives in common a release signal from the release command line 20*c* which conditions all of the clear gates. Line 20*c* is energized whenever the Processor 10 issues a "release" instruction to the control logic 13*a* over the input bus 14. The control logic 13*a* decodes the release instruction by energizing line 20*c* which conditions all the clear gates 30. Final selection of the particular clear gate 30 is obtained from the I/O selection lines $\mathbf{19}_1$ to $\mathbf{19}_n$.

The operation of Applicant's invention will now be described in connection with the sequence diagrams of FIG. 4 and the instruction sequence shown in FIG. 5. Briefly, as illustrated in FIG. 5, the device reserve command comprises a 3 byte sequence. Assume that it is desired to reserve at least one of the devices 11 to 12 to a given program. In this case, the Processor 10 program first issues on bus 14 as shown at line A in the left-hand side of FIG. 4 a device address instruction byte, here represented by byte No. 1 in FIG. 5. The least significant four bits (DA), for example, of this instruction byte are coded to represent the number of the device to be reserved while the four most significant bits (C.U.) are coded to select the control unit which in the present assumed example is Control Unit 13. This byte is gated into the control logic 13*a* where the four least significant bits are used to select the device to be reserved. For example, if device No. 1 is to be reserved the four least significant bits (D.A.) would be coded as 0001. In the Control Unit 13, these least significant bits are stored in a device address register where they are decoded to energize one of the I/O select lines $19_1$ to $19_n$ corresponding to the device to be reserved. In the assumed case this would be line $19_1$. The energization of the I/O select line is shown by line B of FIG. 4. Next the Processor 10 issues a "reserve" command byte. This command also is an eight bit character which appears on the output bus 14 and is represented in FIG. 5 as byte No. 2. Again in the Control Unit 13, the reserve command instruction byte is stored in a command register where it is decoded to energize the control line 20*a* as indicated by line C. of FIG. 4. During the energization of the Control Line 20*a*, the Processor 10 transmits a reserving bit pattern on the data bus 17 as shown by line D of FIG. 4 and byte No. 3 in FIG. 5. (For purposes of illustration only the four least significant bits of byte No. 3 are shown as being used.) Energizing the control line 20*a* partially conditions gates $26_1$ to $26_n$ and the comparator 25 output gate 32. Similarly, the selected I/O line, $19_1$ in this case, conditions gate $27_1$ and opens the output gates 23*a* to 23*d* of the reserve register 21. Then if the device No. 1 has not previously been reserved as is initially assumed, reserve register 21 will have been previously cleared to all zeros. The all zero output from gates 23*a* to 23*d* will be detected by the zero decoding device 24 to energize line 24*e* and provide a further conditioning signal for gates $26_1$ to 26*n*.

Now assume that the selected device is "ready" and "on line" the control lines 33 and 34 from the device control logic 50 will be energized so that gate $27_1$ will produce an output which energizes line 35 to thus strobe gate $26_1$. Gate $26_1$ being fully conditioned by the output from gate $27_1$; the output of the zero decode 24 and the signal on reserve command lines 20*a* produces an output which is applied in parallel to the input "AND" gates 22*a* to 22*d* of the reserve register 21 and also to the "NOR" gate 29.

The output signal from gate $26_1$ thus opens the input gates 22*a* to a *d* to the reserve register 21 to thereby permit the bit pattern then present on bus 17 to be stored in the reserve register 21 and thereby reserves device No. 1 to the program issuing the reserve command. At the same time the output from gate $26_1$ passes through the "NOR" gate 29 to the control unit output circuitry 51. Circuit 51 detects the output of "NOR" gate 29 and inhibits the "busy" line 52 during the reserve command instruction to a signal level (line E of FIG. 4) which indicates to the Processor 10 that the device has been successfully reserved by the reserving program.

After an I/O device has been reserved as aforedescribed any other program not having associated with it the proper reserve code will be precluded from using the reserved device. For example, assume that a second program tries to reserve device No. 1 (after device No. 1 has been reserved) using a different pattern of reserve bits. The sequence of events is then as shown in right side of FIG. 4. The second program issues a device address code for the device No. 1 which in turn generates the I/O select signal on line $19_1$ as shown by line B of FIG. 4. Energizing line $19_1$ strobes the gates 23*a* to 23*d* to read out the contents of the reserve register 21. Since register 21 has a bit pattern stored in it other than all zeros the zero decode 24 fails to produce an output signal and gate $26_1$ therefore remains inactive. At the same time the bit pattern read out from the reserve register 21 and applied to comparator 25 being different than the new reserve pattern appearing on bus 14 fails to provide an output from the Comparator 25. The absence of an output from gate $26_1$, together with the absence of an output from Comparator 25 and hence from gate 32 produces an output signal from the "NOR" gate 29 which is applied to circuit 51. Circuit 51 responds to the output from "NOR" gate 29 to produce a signal on the busy line 52 during the reserve command instruction (Line E, right side FIG. 4) which indicates to the Processor 10 that the device has been already reserved.

If the original or some second program, however, having the same reserve bit pattern wishes to use a reserved I/O device it can do so. In this instance, and again assuming that device No. 1 is to be used, the device address command is given to select line $19_1$ as before. This signal opens gates 23 to feed the pattern stored in the associated register 21 to the comparator 25. Next the reserve command is issued. At this time the bit pattern identifying the reserving program appears on the bit lines *a* to *d* of bus 14. Since the incoming reserve pattern appearing on bus 14 matches that stored in the register 21, the two inputs to comparator 25 match and the comparator 25 produces an output signal which together with the energization of control line 20*a* produces an output from gate 32. The output from gate 32 transmits a signal through "NOR" gate 29 to circuit 51 to again inhibit a signal level on line 52 which indicates to the Processor 10 that the reserve function has been successfully completed.

Finally, after a device has been reserved, it is held to the reserving program until released by a specific release command. For example, after a program has been executed and there is no further need for the device to be reserved to that program, the Processor 10 will issue a release command to the reserved I/O device. This command is a two byte word similar to the first two bytes of FIG. 5 except that the second byte is coded to represent a "release function." Thus to release the reserved device the program being run in the Processor 10 first issues a device address instruction byte followed by the release command byte itself (byte No. 2). The device address instruction byte, as before is decoded in the Control Unit 13 so as to energize the proper I/O select line which in turn conditions the clear gate 30 of the associated reserve register 21. Following this, the processor issues the release command byte which energizes control line 20*c* to thereby transmit a clearing pulse through gate 30 and line 30*a* to the register 21. The clearing pulse clears the register 21 to an all zero condition thus preparing the device for the receipt of a new reserve command.

From the foregoing description it will be seen that the device reserve function provided by this invention may also be utilized by a multi-processor system such as shown by FIG. 3. As illustrated in this figure, such a system comprises at least a pair of processor units A and B and at least a pair of Control Units A and B and a common set of I/O devices 1 through N. In this system, either of the processors A or B can access any of the I/O devices through either of the Control Units. The Control Units and I/O devices would, of course, be modified as indicated in FIG. 2 and the processors would provide a control unit selection function as is conventional in such a system.

What is claimed is:

1. In a data processing system having, a data processor section for executing one or more stored programs, a plurality of input-output devices, and an input-output control unit section which functions to transmit data and command signals received from the processor section to the input-output devices an improvement which comprises an input-output device reserve system for reserving any of said input-output devices to one or more programs being executed by said processor section wherein those of said programs desiring to reserve an input-output device contains a binary coded device reserve signal byte coded to identify the associated program, said reserve system comprising: a separate multibit reserve register for each of said input-output devices, separate read out means coupled to each of said reserve registers, means for activating a selected one of the read out means in response to a device selection signal received from said control unit section which selects the corresponding reserve register, an all zero detection circuit coupled to the output of the read out means of said reserve registers operative to produce an output when an all zero condition is read from the selected reserve register, a comparator, means coupling the output from the selected read out means of said reserve registers to said comparator as one input thereto, means coupling the coded device reserve signal byte received from the control unit to said comparator as a second input thereto whereby the contents being read from the selected reserve register are compared with the received coded device reserve signal byte, said comparator producing an output signal when the two inputs thereto correspond, means for storing the device reserve coded signal byte received from the control unit in the selected one of said reserve registers, said last named means being rendered active by a device reserve command signal received from said control unit in combination with an output from said all zero detection circuit, and signalling means responsive to the receipt of a reserve command signal from said control unit and to the outputs from either the all zero detection circuit or the comparator for indicating the reserve status of the input-output device corresponding to said selected reserve register.

2. The system as set forth in claim 1 wherein there is included, means for clearing a selected reserve register to an all zero condition in response to a release command signal received from the control unit.

3. In a data processing system having, a data processor section for executing one or more stored programs, a plurality of input-output devices, and an input-output control unit section which functions to transmit data and command signals received from the processor section to the input-output devices; an improvement which comprises an input-output device reserve system for reserving any of said input-output devices to one or more programs being executed by said processor section wherein those of said programs desiring to reserve an input-output device contains a binary coded device reserve signal byte coded to identify the associated program, said reserve system comprising: a separate multibit reserve register for each of said input-output devices, separate read out means coupled to each of said reserve registers, means for activating a selected one of the read out means in response to a device selection signal received from said control unit section which selects the corresponding reserve register, an all zero direction circuit coupled to the output of the read out means of said reserve registers operative to produce an output when an all zero condition is read out from the selected reserve register, means for storing the device reserve signal byte received from the control unit in said selected reserve register, said last named means being rendered operative by a device reserve command signal received from the control unit in combination with an output from the all zero detection circuit, and signalling means responsive to an output signal from the all zero detection circuit and to the receipt of a reserve command signal from the control unit for indicating the reserve status of the input-output device corresponding to said selected reserve register.

4. The combination set forth in claim 3 wherein there is further included means for clearing the selected reserve register to an all zero condition in response to a release command signal received from the control units.

* * * * *